US008550434B1

(12) United States Patent
Hanlon

(10) Patent No.: US 8,550,434 B1
(45) Date of Patent: Oct. 8, 2013

(54) CYLINDER JACK STAND

(75) Inventor: Jared Hanlon, Santa Clarita, CA (US)

(73) Assignee: Kai Hsiang Traffic Appliance Co. Ltd. (TW)

( * ) Notice: Subject to any disclaimer, the term of this patent is extended or adjusted under 35 U.S.C. 154(b) by 0 days.

(21) Appl. No.: 13/352,135

(22) Filed: Jan. 17, 2012

(51) Int. Cl.

| | |
|---|---|
| ***A62B 3/00*** | (2006.01) |
| ***B66F 3/24*** | (2006.01) |
| ***B66F 7/12*** | (2006.01) |
| ***E21D 15/44*** | (2006.01) |
| ***E21B 19/00*** | (2006.01) |
| ***B23P 19/04*** | (2006.01) |
| *B66F 3/25* | (2006.01) |

(52) U.S. Cl.
USPC ............. 254/93 R; 254/30; 254/89 H; 29/227

(58) Field of Classification Search
USPC ..................... 254/93, 93 R, 89 H, 30; 29/227
See application file for complete search history.

(56) References Cited

U.S. PATENT DOCUMENTS

| | | | | | |
|---|---|---|---|---|---|
| 1,990,004 | A | * | 2/1935 | Shannon | 60/482 |
| 3,155,372 | A | * | 11/1964 | Brown | 254/30 |
| 3,496,869 | A | * | 2/1970 | Engel | 102/522 |
| 3,548,899 | A | * | 12/1970 | Emerson | 144/336 |
| 3,946,988 | A | * | 3/1976 | Kehren | 254/30 |
| 4,262,881 | A | | 4/1981 | Gray | |
| 4,804,165 | A | * | 2/1989 | Pippin et al. | 254/30 |
| 5,322,265 | A | * | 6/1994 | Keuck | 254/89 H |
| 5,791,033 | A | * | 8/1998 | Norby et al. | 29/227 |
| 6,027,101 | A | | 2/2000 | Marx | |

* cited by examiner

*Primary Examiner* — Lee D Wilson
*Assistant Examiner* — Alvin Grant
(74) *Attorney, Agent, or Firm* — Cherskov Flaynik & Gurda, LLC

(57) ABSTRACT

A device acting as a cylindrical jack stand is described. The device includes at least one encirclement band. The encirclement band or bands are removably attached to the cylindrical jack by attaching a handle through the bands to the jack. The bands include apertures for one or more accessories. The apertures are aligned with an extended region of the base such that any accessories inserted in the apertures are supported by the extended region of the base.

9 Claims, 3 Drawing Sheets

CYLINDER JACK STAND

BACKGROUND OF THE INVENTION

1. Field of the Invention

This invention relates to a removably attached stand and handle combination for a pressurized container and more particularly, this invention relates to a device to attach a handle to a cylinder jack.

2. Background of the Invention

A cylinder jack, also known as a bottle jack, comprises a substantially cylindrical body containing a hydraulic fluid at high pressure. In most cylinder jacks, while the jack is in a collapsed configuration, the interior compartment experiences considerable pressure.

A handle is preferably attached to the outside of the bottle jack due to the weight of the bottle jack, and to improve the ease of moving of the jack.

In order to automate the manufacturing of the jacks, the substantially cylindrical body of the jack is filled with the hydraulic fluid and the bottle jack is sealed to the outside atmosphere before anything, such as a handle, is attached to the outside of the main body of the cylinder jack. It is also difficult to permanently attach the handle at the time of the manufacturing since the position of the handle attachment is dependent on the final use of the jack. Given that cylindrical jacks are often used in tight environments, such as underneath a vehicle, an incorrectly-located handle could interfere with the use of the jack.

Therefore, in conventional jacks, the end-users of the jack attach the handle to the body of the jack through a number of processes, including spot welding. These processes involve heat, and pose some danger given the pressure of the jack. Further, the heat decreases the working life of the jack.

For example, U.S. Pat. No. 4,262,881 to Gray describes a bottle jack with anti-binding properties. Further, the patent shows a permanently affixed pair of handles. Consequently, if the bottle jack of Gray were to be used in a confined space, one or more of the handles would need to be removed, if such removal is even possible.

Another bottle jack is shown in U.S. Pat. No. 6,027,101 to Marx. The bottle jack discussed in Marx does show a jack with a defined base. The base is permanently attached, however, and no means of retrofitting a pre-existing jack is discussed. Furthermore, the patent fails to show a handle or any means to attach a handle to the main body of the bottle jack.

A need exists in the art for a re-configurable cylindrical jack handle and stand, which is removable, but remains closely coupled with the cylindrical jack when the jack is in use.

SUMMARY OF INVENTION

An object of the present invention is to provide a device which eliminates many of the drawbacks in state of the art of cylindrical jacks.

Another object of the invention is to provide a means to allow a bottle jack to be moved securely, but without requiring permanent attachment. A feature of one embodiment of the invention is a handle which can be retrofitted to attach to a pre-existing bottle jack without requiring permanent attachment to the main bottle jack body. An advantage of the invention is that a means for moving the bottle jack is provided that does not require permanent attachment so that the handle may be removed when it would otherwise interfere with the intended use of the jack.

Still another object of the invention is to allow for secure coupling of a handle to a heavy cylindrical jack without requiring high-temperature welding to the outside of the cylindrical jack. A feature of one embodiment of the invention is that the handle is attached to the body of the jack through the use of mechanical attachment means. An advantage of the invention is that high temperatures do not have to be used to couple a handle to the main jack body.

Yet another object of the present invention is to provide a system for storing parts or accessories for a cylindrical jack along with the jack itself. A feature of the invented device is that the cylindrical jack stand discussed in the system extends beyond the perimeter of the cylindrical jack main body. An advantage of the invention is that the additional surface area of the stand can be used to store any parts and accessories that are used in conjunction with the jack.

A further object of the invention is to transfer weight of the item being lifted over a larger surface area than the bottom surface of the main body of the jack. A feature of the invention is that contrary to a traditional cylindrical jack, the stand has a surface area that is larger than the bottom surface of the cylindrical jack. An advantage of the invention is that it maximizes the surface area of contact between the jack and the surface supporting the jack and stand assembly thereby increasing the stability of the jack.

Another object of the invention is to insulate the cylindrical jack from a potentially harmful environment. A feature of one embodiment of the invention is that the jack handles may be used with a removable substrate which acts as a base. An advantage of the invention is that the jack and base combination may be used in environments where a jack by itself would not be useable due to environmental issues.

Yet another object of the invention is to provide a handle and stand combination that can be retrofitted to nearly any type of a cylindrical jack. A feature of the invention is that an embodiment of the invention contains extendible elements. An advantage of the present invention is that one embodiment may be used with multiple cylindrical jacks and the one embodiment may be used with multiple manufacturers of jacks.

Another object of the invention is to facilitate maintenance and cleaning of the cylindrical jack. A feature of the invention is that the elements may be separated from the jack. An advantage of the invention is that the additional elements of embodiments of the invention do not interfere with the maintenance, including cleaning, of the jack.

Briefly, the invention provides a cylindrical jack stand comprising a plurality of jack encirclement bands wherein each encirclement jack features a connection aperture; a handle having a first end and a second end; and at least one attachment means located on an outside surface of said cylindrical jack wherein said encirclement bands are removably attached to said cylindrical jack by connecting said handle through said connection aperture to the attachment means.

BRIEF DESCRIPTION OF DRAWING

The invention together with the above and other objects and advantages will be best understood from the following detailed description of the preferred embodiment of the invention shown in the accompanying drawings, wherein.

DETAILED DESCRIPTION OF THE INVENTION

The foregoing summary, as well as the following detailed description of certain embodiments of the present invention, will be better understood when read in conjunction with the appended drawings.

Figure 1:
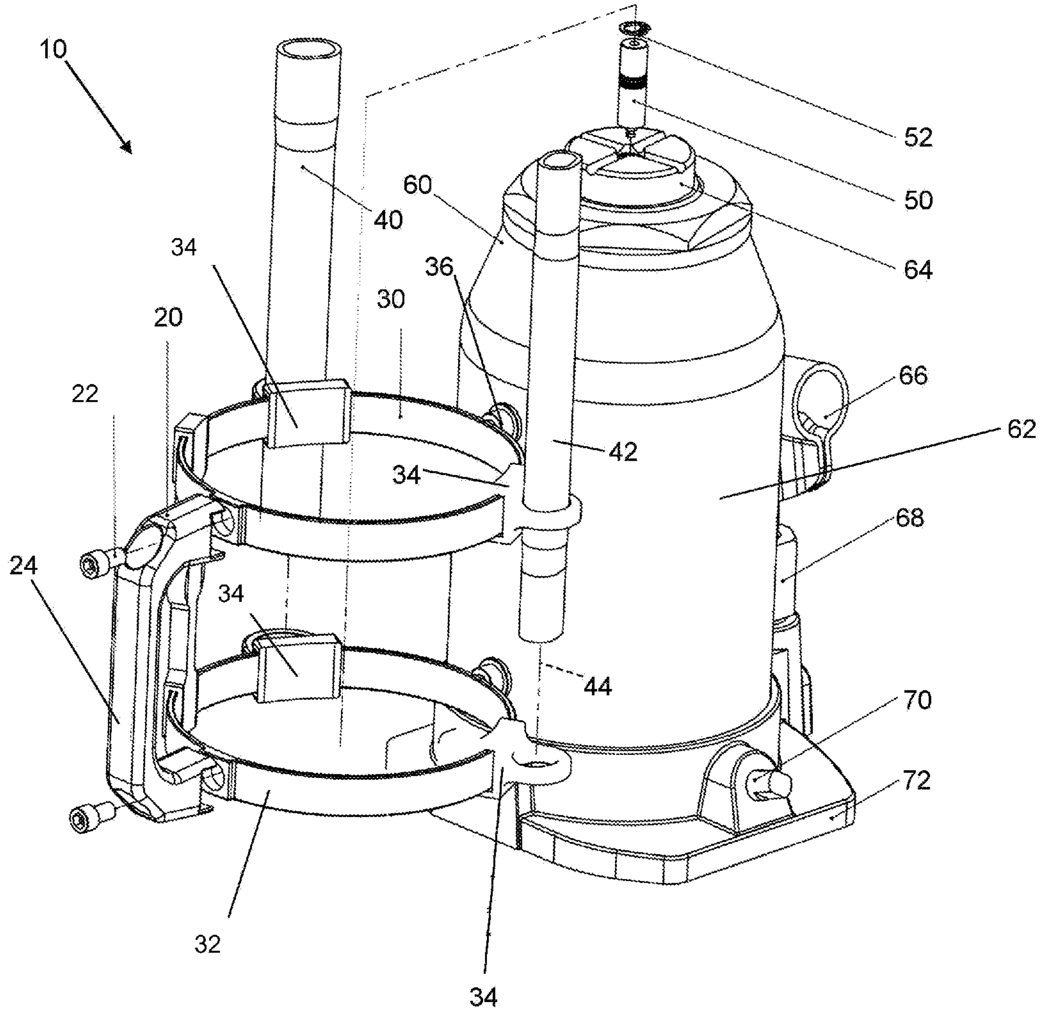
FIG. 1 depicts a perspective view showing an embodiment of the features of the invention.

Turning to FIG. 1, as shown therein, an embodiment of the device 10 broadly comprises two encirclement bands 30 and 32 coupled together by a handle 20.

The elements of the device 10 are designed to removably connect to a cylindrical or bottle jack 60. The bottle jack 60 comprises a substantially flat region, defining a jack main body 62. In one embodiment, the device 10 is intended for use with a jack 60 whose main body 62 has a standard or non-standard size circumference.

Bottle Jack Description

The device 10 is compatible with a large variety of cylindrical jacks, but the cylindrical or bottle jacks share similar components. The jack comprises a jack saddle 64 at a first end of the jack main body 62 and an integral jack base 72 disposed at the second end of the jack main body 62. In operation, the jack saddle 64 is in an upright position, while the jack base 72 rests on a flat surface.

In the embodiment shown in FIG. 1, the jack saddle 64 includes means to removably attach a laser source 50 to the saddle 64. In one embodiment this attachment means is a threaded nut, designed to receive a threaded screw from the laser source 50. A laser clip 52 is also removably attached to the laser source 50. The laser clip is used to visually target the center of the cylinder jack to the load to be carried by the cylinder jack.

The laser source 50 is removably attached to the jack saddle 64 to allow precise location of the middle of the jack saddle 64 on the surface to be lifted by the jack 60. Prior to operation of the jack 60, which includes the lifting of the jack saddle 64, the laser light source 50 is removed from the jack saddle 64. Therefore, the laser source 50 does not contact the surface to be lifted by the jack 60. In the embodiment shown in FIG. 1, the jack saddle 64 contacts the surface to be lifted. However, in another embodiment, not shown, the jack saddle 64 receives a removable pad in place of the laser source 50 before the jack 60 is actuated resulting in the upward movement of the jack saddle 64.

Upon contact of the jack saddle 64 with the surface to be lifted, the weight of the surface to be lifted is transferred through the jack 60 to the integral jack base 72. In operation, the integral jack base 72 must be placed on an even surface to prevent slipping or falling over of the jack 60. Further, the integral base 72 must be insulated from harmful environments.

The main body 62 of the jack 60 contains the hydraulic lifting mechanism which propels the jack saddle 64. The hydraulic lifting mechanism generally employs highly compressed hydraulic fluid (not shown), allowing a relatively small jack 60 to lift large weights, including ones exceeding several tons. Bottle or cylindrical jacks which use a different mechanism, such as purely mechanical lifting or air-pressure lifting may be used with the device 10, so long as the jack contains a substantially flat main body 62.

Figure 2:
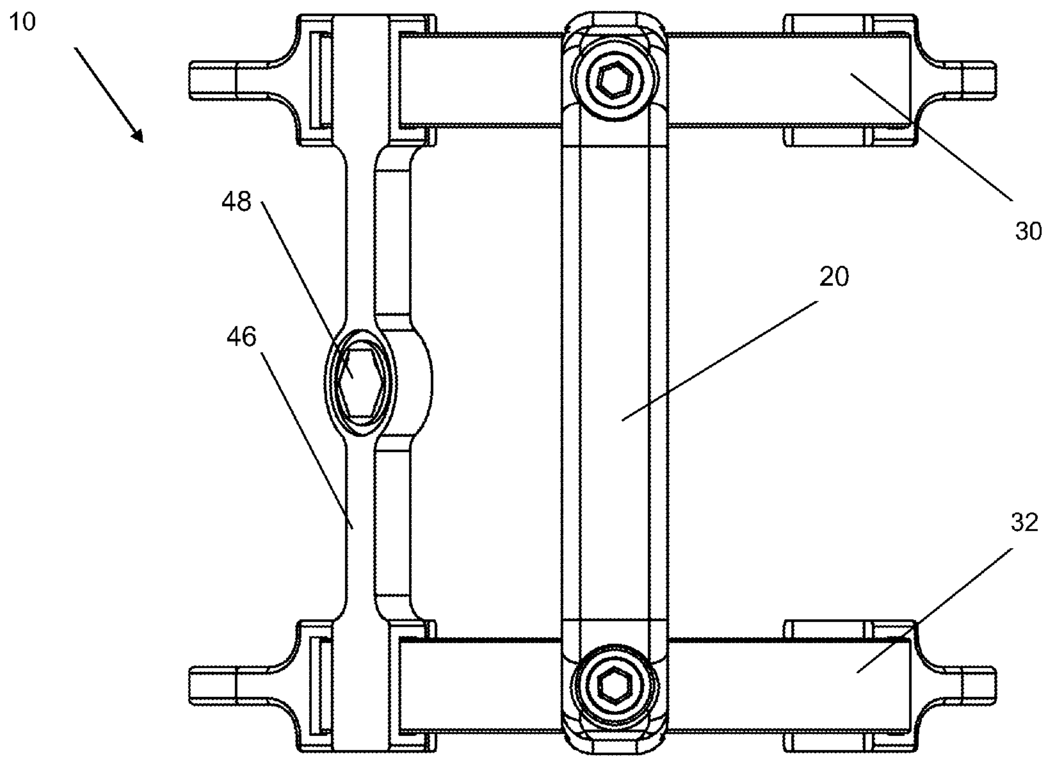
FIG. 2 is another perspective view showing an embodiment of the features of the invention.

The lifting mechanism of the jack 60 is activated through the action of a piston 68, best shown in FIG. 2. The piston is moved through action on the piston handle receptacle 66. In one embodiment, the jack saddle 64 is moved upward by the lateral movement of the piston handle receptacle 66. In other embodiments, a torque action on the piston handle receptacle 66 actuates the lifting mechanism causing the jack saddle 64 to move away from the jack body 62.

In the embodiment shown in FIG. 1, the force required to move the piston handle receptacle 66 constant, regardless of the weight placed on the jack saddle 64. In one embodiment, the piston handle receptacle 66 cannot be moved if the weight on the jack saddle 64 exceeds the operational limit of the jack 60.

In order to release the lifting mechanism and move the jack saddle 64 towards the main body of the jack 62, the pressure within the jack 60 must be released. In the embodiment shown in FIG. 1, the internal pressure of the jack 60 is controlled by the pressure release valve 70. In one embodiment, the pressure relief valve 70 is moved from an open to a closed position by applying a rotational torque force to the relief valve 70.

The jack 60 therefore contains two elements that must be manipulated in order to operate the jack 60: the piston handle receptacle 66, and the release valve 70. While it is possible to operate these elements by hand or through the use of simple tools, such as wrenches, in order to actuate both elements with ease, special tools are used, and these are described below.

Further, it should be appreciated that the jack 60 is a self-enclosed unit. The lifting mechanism operates when it is isolated from the environment. In most embodiments, the jack 60 comprises a metal body with the jack base 72 being molded from the same piece of metal as the remaining components of the jack 60.

For ease of placement during use and ease of manufacturing, the jack 60 is made as a single cylinder with no protruding handles. Further, the jack 60 is filled in a factory, given that the jack 60 lifting mechanism must be separated from the surrounding atmosphere to allow for pressure-based operation of the hydraulic mechanism.

Device Detail

In one embodiment, the device 10 comprises two encirclement bands 30, 32, a first encirclement band 30 and a second encirclement band 32. The two encirclement bands 30, 32 are designed to have an inside diameter that closely matches the outside diameter of the cylinder jack main body 62. Therefore, when the two encirclement bands 30,32 are applied to the main body 62, they closely approximate the outside profile the main body 62.

The encirclement bands shown in FIG. 1 are designed to approximate the main body 62 of the jack 60. However, in other embodiments, the encirclement bands 30, 32 (not shown) include means to adjust the size of the bands therefore allowing the bands to be used with cylinders of various sizes. The adjustment means can include features such as buckles, clips, reversibly deformable encirclement bands, or the like.

In other embodiments, the encirclement bands 30, 32 are made out of an adjustable material allowing for more than one diameter of the cylinder jack 60 to be enclosed by the encirclement bands 30, 32.

Using one of the methods above, the encirclement bands 30, 32 will closely match the diameter of the jack main body 62. However, the encirclement bands 30, 32 will not maintain a set position on the main body 62 without a form of affixation.

In the embodiment shown in the FIG. 1, the encirclement bands 30, 32 are kept at a fixed distance from one another through the removable attachment of a handle 40 through the encirclement bands 30, 32. The handle 40 is attached through the encirclement bands 30, 32 by driving a handle attachment bolts 22 through each encirclement band 30, 32. The handle attachment bolts 22 are received by band and handle attachment apertures 36 on the main body of the jack 60.

Upon insertion of the attachment bolt 22, both the handle 20 and the bands 30, 32 are affixed to the main body 62 of the jack 60. While the handle 20 and the bands 30, 32 are attached to the main body of the jack, the attachment is temporary and both elements can be removed by the removal of the handle attachment bolt 22 from the band and handle attachment aperture 34.

The handle 20 comprises a gripping section 24, and apertures for receiving the handle attachment bolts 22 at opposing ends of the gripping section 24. In the embodiment shown in FIG. 1, the gripping section 24 is substantially flat to allow for printing of a brand name, unit identifying information, or the like. In other embodiments, not shown, the gripping section 24 includes a reversibly deformable material to promote holding of the handle 20 by the end user.

The encirclement bands 30, 32 further include at least one accessory attachment means. In the embodiment shown in FIG. 1 the accessory attachment means comprise an attachment aperture 34. In the embodiment shown in FIG. 1, the location of an accessory aperture 34 on the first band 30 is approximately matched by the location of a corresponding accessory aperture 34 on the second band 32. Therefore, an accessory, such as tube 42 may be slidably received by both accessory apertures 34 when moved in direction 44.

In one embodiment, the accessory apertures 34 are magnetized so that the accessory aperture is magnetically attracted to the accessory 34 and the jack main body 62. The magnetic embodiment of the apertures allow both the maintenance of the bands in place as well as keeping the accessories within the apertures 34.

In the embodiment shown in FIG. 1, other than the accessory tube 42, a second set of the accessory apertures 34 is designated for holding of a piston actuation handle 40. In use of the jack, the piston actuation handle 40 is removably received by the piston handle receptacle 66. Therefore, the encirclement bands 30, 32 ensure that the piston actuation handle 40 is stowed and stored in close proximity to the jack 60. The accessory tube 42 may be used to activate the release valve 70, or other suitable purposes.

By providing storage for both components needed for operation of the jack 60, the device 10 ensures that operation of the jack 60 will occur as intended, and not using direct manual force input or hand tools that could damage the piston 68 or release valve 70. Further, the bands 30, 32 provide for a removable attachment of a handle 20 to the jack 60.

Figure 3:
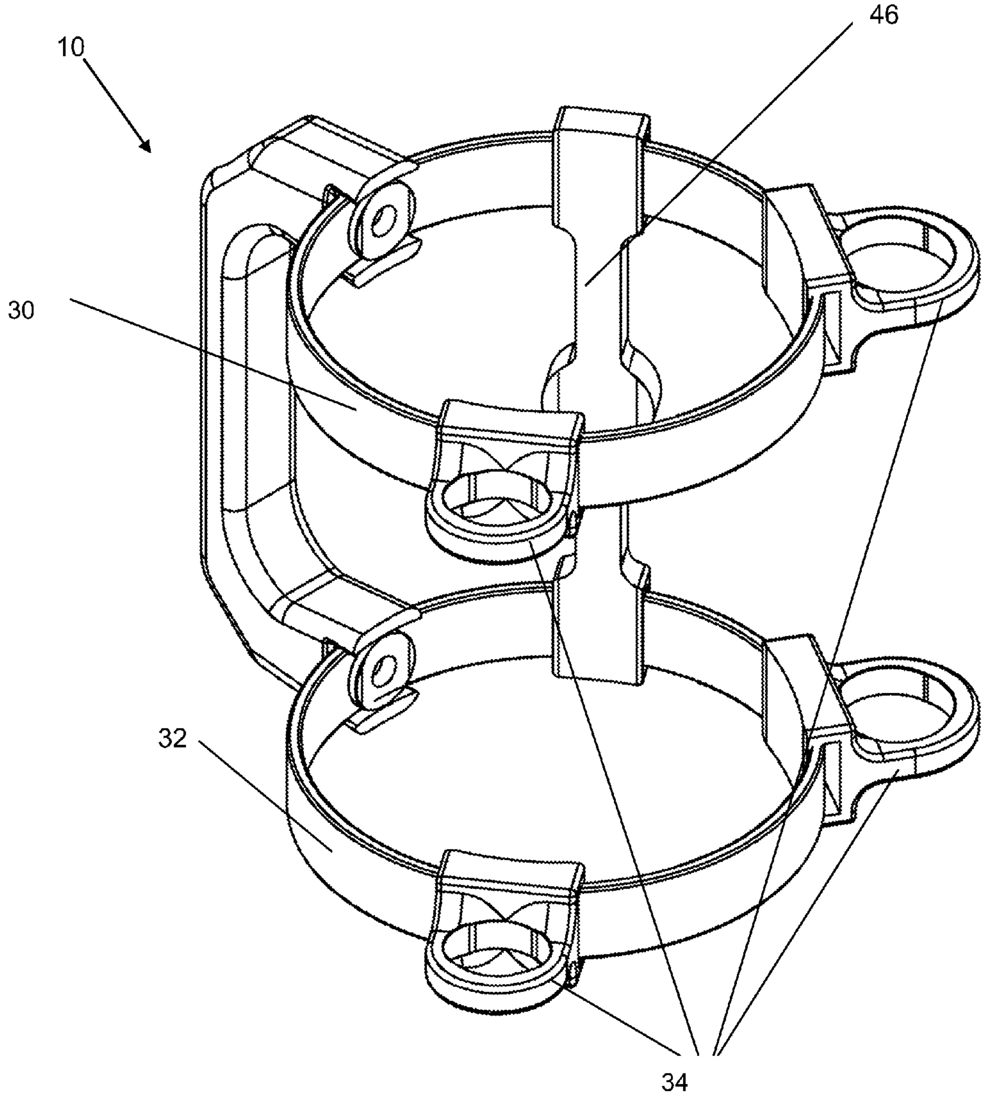
FIG. 3 is another perspective view showing an embodiment of the features of the invention.

FIGS. 2 and 3 depict the device 10 as removed from a cylindrical jack. As can be best seen in FIG. 2, an embodiment of the device 10 further comprises a vertical brace 46. Said vertical brace 46 is a resilient member designed to connect the first encirclement band 30 with the second encirclement band 32. In addition to the brace 46, the two encirclement bands are joined together by the handle 20. However, in one embodiment, when the device 10 is not installed on a jack, the handle 20 is not permanently affixed to the encirclement bands. Therefore, the brace 46 ensures that the bands are maintained together in a configuration suitable for installation on a bottle jack. In one embodiment, the brace 46 comprises an information display region 48 which is substantially flat and is capable of conveying information, such as a brand name, model number, and the like.

Use Detail

In use, the jack the cylinder jack stand 10 is attached to a cylinder jack by connecting the stand 10 to the band and handle attachment aperture 36. The attachment aperture 36 removably connects with a complimentary bolt or stud welded to the cylinder jack or another complimentary protrusion from the jack. Next, as part of the installation process, the two encirclement bands 30 and 32 are attached to the handle grommets 34. The handle grommets 34 are installed prior to the encirclement bands being installed on the main body of the jack. The brace 46 is added to the encirclement bands 30, 32 to ensure proper spacing between the bands and the main body of the jack. The handle 20 is attached to the bands 30, 32. The handle 20 also ensures that required spacing is maintained between the encirclement bands 30, 32 and the main body of the jack. With the handle 20 removably attached, the encirclement bands 30, 32 are subsequently installed around the main body of the jack. Two handle attachment bolts 22 are inserted through the handle 20 openings. The bolts 22 extend through the handle 20 and the encirclement bands 30, 32 attaching the bands 30, 32 to the main body of the jack. After the assembly consisting of the handle 20 and the encirclement bands 30, 32 is attached to the main body of the jack, additional two metal handles 40, 42 are placed through the grommets 34 for storage.

As used herein, an element or step recited in the singular and preceded with the word “a” or “an” should be understood as not excluding plural said elements or steps, unless such exclusion is explicitly stated. Furthermore, references to “one embodiment” of the present invention are not intended to be interpreted as excluding the existence of additional embodiments that also incorporate the recited features. Moreover, unless explicitly stated to the contrary, embodiments “comprising” or “having” an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms “including” and “in which” are used as the plain-English equivalents of the terms “comprising” and “wherein.” Moreover, in the following claims, the terms “first,” “second,” and “third,” are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase “means for” followed by a statement of function void of further structure.

The embodiment of the invention in which an exclusive property or privilege is claimed is defined as follows:

1. A cylindrical jack stand comprising:

a. a plurality of jack encirclement bands wherein each encirclement band features a connection aperture;

b. a handle having a first end and a second end; and c. at least one attachment means located on an outside surface of said cylindrical jack wherein said encirclement bands are removably attached to said cylindrical jack by connecting said handle through said connection aperture to the attachment means.

2. The cylindrical jack stand of claim 1 wherein said encirclement bands further comprise at least one accessory aperture.

3. The cylindrical jack stand of claim 2 wherein said encirclement bands further comprise an even number of accessory apertures located on the same position of each encirclement band.

4. The cylindrical jack stand of claim 3 wherein two of said accessory apertures removably receive a piston actuation handle.

5. The cylindrical jack stand of claim 3 wherein two of said at least one accessory aperture is magnetic.

6. The cylindrical jack stand of claim 1 wherein said handle includes a substantially flat surface wherein said substantially flat surface faces outwardly from said cylindrical jack stand.

7. The cylindrical jack stand of claim 1 further comprising a removable base with an extended region.

8. The cylindrical jack stand of claim 7 wherein said encirclement bands further comprise at least one accessory aperture and wherein said removable base extended region is positioned beneath at least one accessory aperture.

9. The cylindrical jack stand of claim 7 wherein said removable base extended region further comprises a means to attach a laser light source to the extended region.

* * * * *